United States Patent Office 3,375,663
Patented Apr. 2, 1968

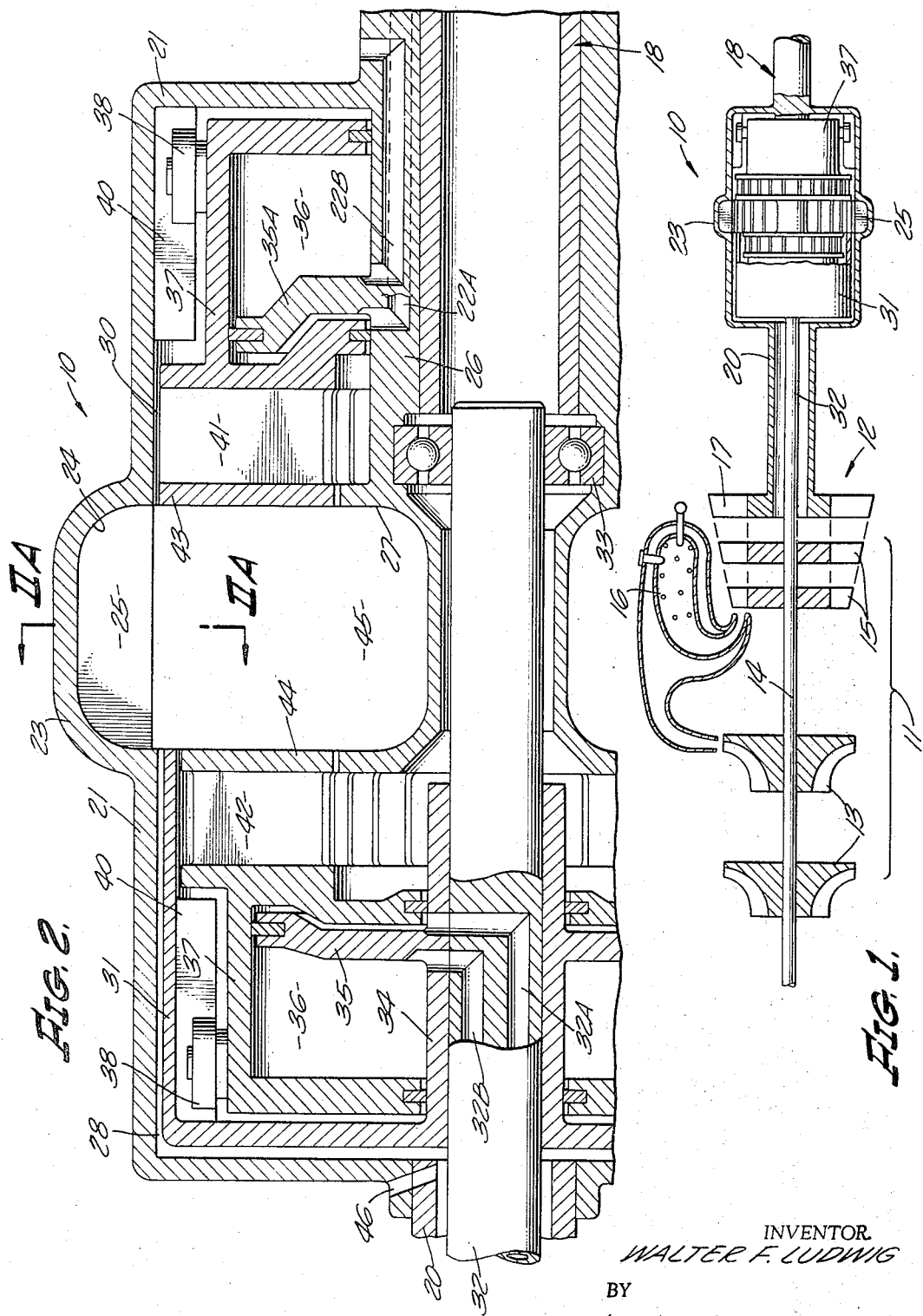

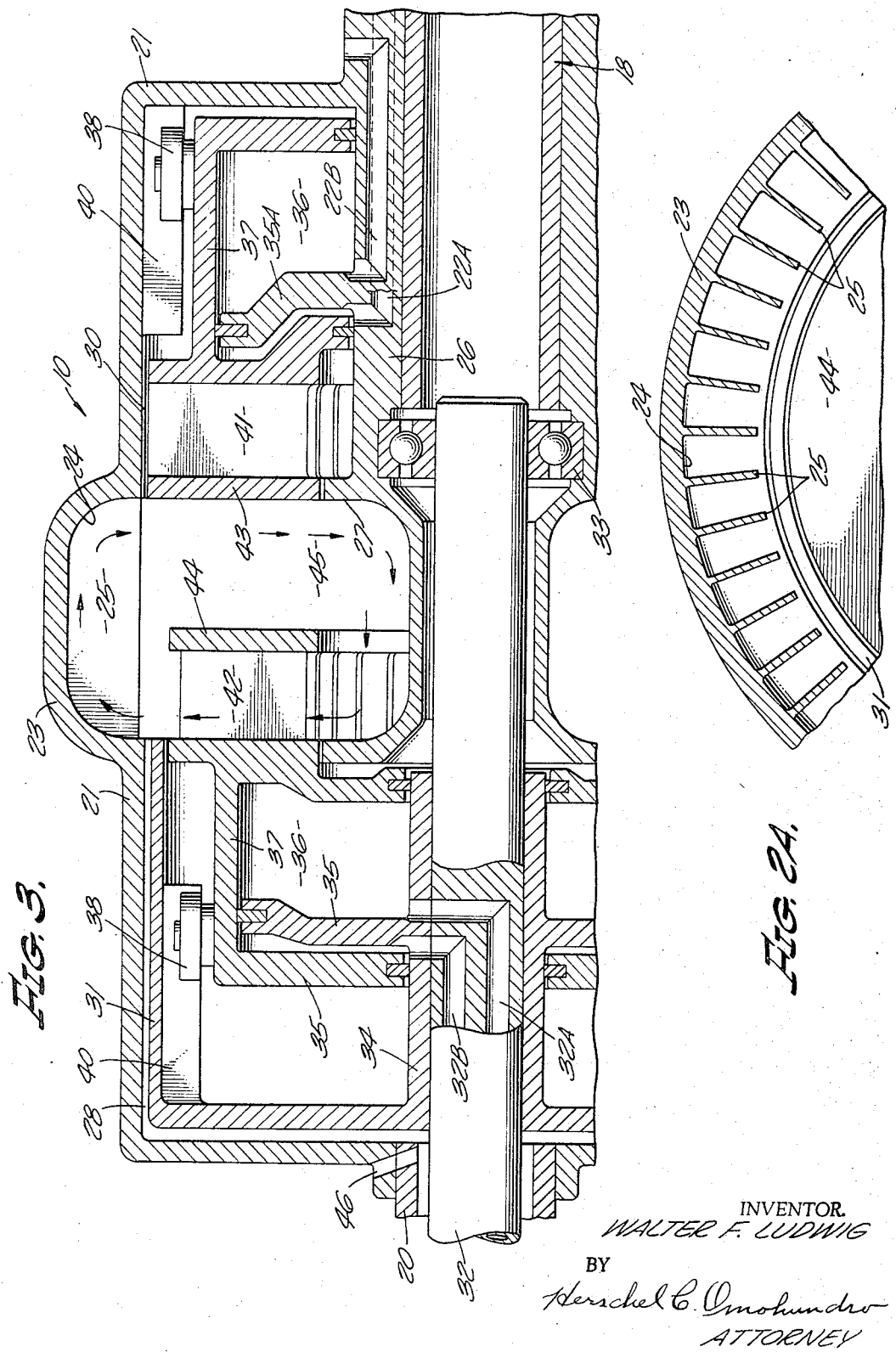

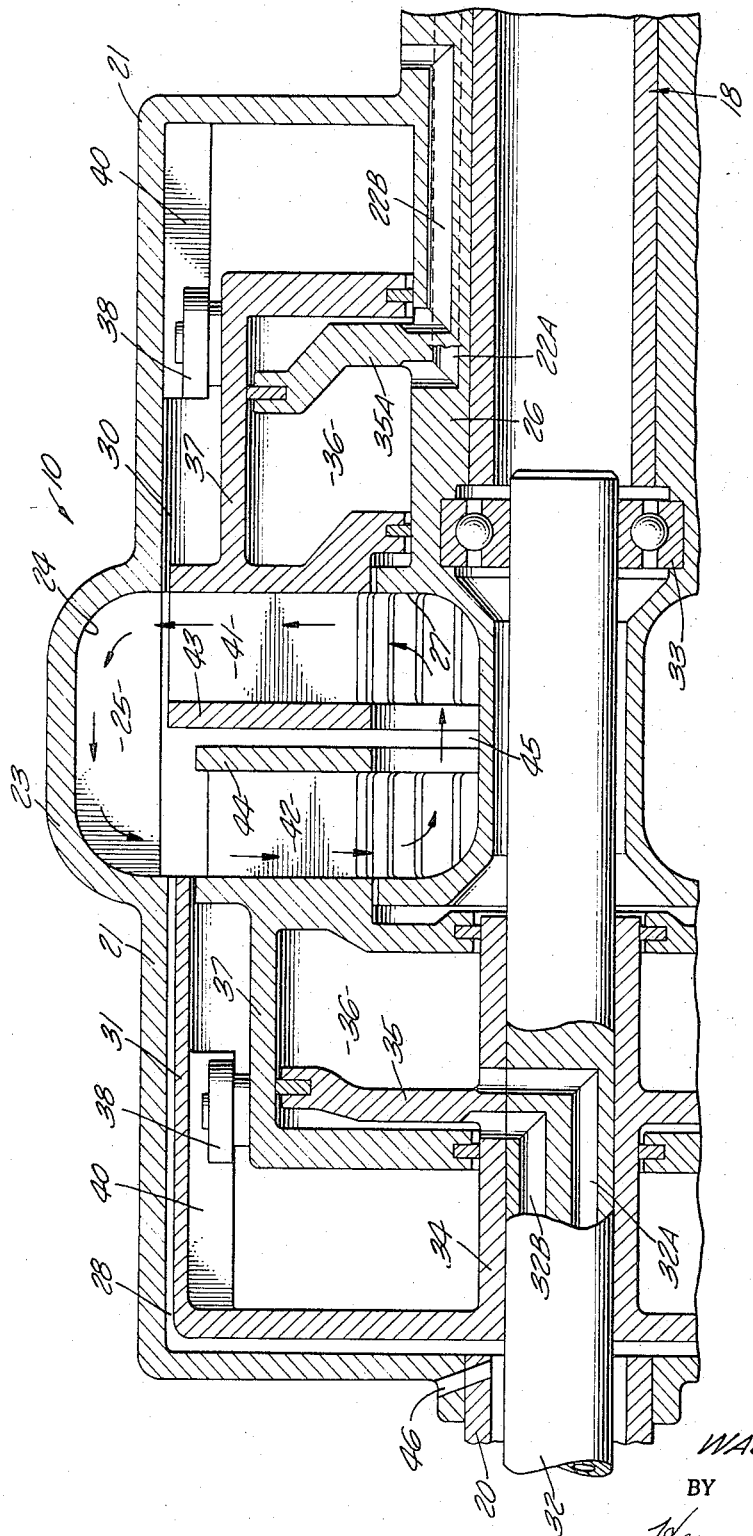

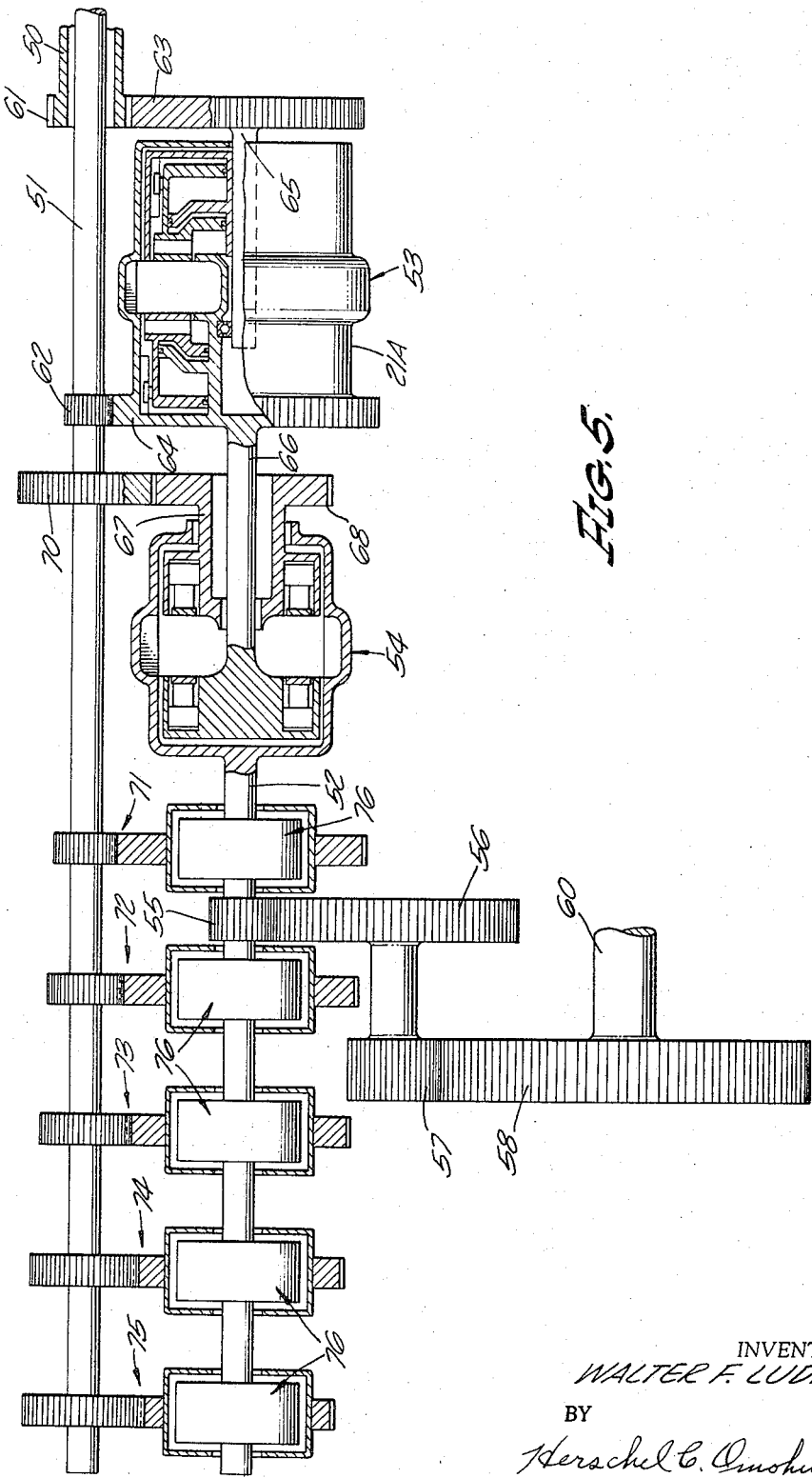

3,375,663
FLUID COUPLING
Walter F. Ludwig, Phoenix, Ariz., assignor to The Garrett Corporation, Los Angeles, Calif., a corporation of California
Filed Aug. 18, 1966, Ser. No. 573,224
14 Claims. (Cl. 60—54)

This invention relates generally to motion-transmitting mechanism, and is more particularly directed to fluid couplings of the type having housing means and rotors with blades or vanes operating in a hydraulic fluid bath contained within the housing. Still more particularly, the invention relates to fluid couplings in which at least one rotor with vanes is power-operated to function as a hydraulic pump to create fluid flow, and another rotor with vanes translates the energy of the flowing fluid into desired motion.

An object of this invention is to provide an improved fluid coupling embodying a simple construction, having a minimum number of parts and being so arranged that the coupling will be filled with hydraulic fluid at all times, thus minimizing the necessity of extra reservoirs, pumps to transfer fluids from the reservoirs to the coupling, and extra control valves for governing the flow the fluids.

Another object of the invention is to provide an improved fluid coupling which is particularly adaptable for use with gas turbines, especially those of the split-shaft type designed for vehicle drives, the coupling serving to temporarily connect the power turbine and gas generator at appropriate times and thus reduce fuel consumption during part-load operation. The coupling also serves to transmit power in the reverse direction from the vehicle to the gas turbine engine, particularly the gas generator portion thereof, to utilize the engine as a braking force for the vehicle during downgrade or speed-reducing operations when heavily loaded.

Still another object of the invention is to provide a fluid coupling in which the power to be transmitted thereby can be smoothly varied from 0 to 100 percent without requiring the addition to or withdrawal of fluid from the coupling.

A further object is to provide a fluid coupling with which power can be transmitted in either direction of rotation and with either shaft serving as the input and/or output element.

Another object is to provide a fluid coupling having a housing with relatively rotatable portions, one of which forms spaced registering groove sections, such housing portion having dual input and output shaft elements while the other housing portion is provided with a single combination input/output shaft element, each housing portion receiving a member with a circular row of vanes which may be moved into and out of the spaced groove sections formed by the first housing portion, one of the groove sections having circumferentially spaced vanes which cooperate with the vanes in the circular rows, when the housing portion provided therewith is revolved, to create a flow of liquid which transmits rotary motion to the member with the other row of vanes and the shaft connected therewith. The percentage of power transmitted depends in part upon the extent of projection of the vanes into the space between the groove sections. Fluid pressure responsive means are provided to effect the adjustment of the members with the circular rows of vanes.

A further object of the invention is to provide a fluid coupling having a housing portion which forms a part of a power-transmitting train and receives rotor elements with vanes which are adjustable in the housing between ineffective positions, occupied when the housing is serving merely as an integral part of a train to transmit power from one source to a point of use, and operative positions, occupied when variable amounts of power are being transmitted to the housing from a different source or variable amounts of power are being transmitted by the housing to another point of use. As an example, the housing may form a part of a power train between the power turbine of a split-shaft turbine engine and the driving wheels of a vehicle. The housing may receive a first rotor with vanes which can be adjusted so that a variable amount of power may be transmitted from the gas generator portion of the split-shaft turbine engine to the power turbine and thence to the driving wheels during part-load operation. The housing may also receive another rotor with vanes which can be adjusted and cooperate with the first rotor, so that power from the driving wheels may be transmitted via the housing and first rotor directly to the gas generator section of the split-shaft turbine engine to utilize the compressor component of such gas generator as a braking means for the vehicle.

Other objects, uses and advantages of the invention will be specifically set forth or made obvious by the following description of one form of the invention illustrated in detail in the accompanying drawings.

In the drawings:

FIG. 1 is a schematic view of a split-shaft-type gas turbine engine provided with a power-transfer fluid coupling formed in accordance with the present invention;

FIG. 2 is an axial sectional view taken through the fluid coupling shown in FIG. 1 and depicts the parts thereof in positions occupied when the coupling is idle or transmitting power directly from the power turbine of the engine of FIG. 1 to a point of use;

FIG. 2A is a fragmentary vertical transverse sectional view taken through the housing of the fluid coupling on the plane indicated by the line IIA—IIA of FIG. 2;

FIG. 3 is an axial sectional view through the coupling with parts in positions occupied when the coupling is functioning to transmit power from both the gas generator and power turbine of the engine to a point of use;

FIG. 4 is a similar view of the coupling with parts in positions occupied when the driven device becomes the driving force such as in a vehicle driving its engine; and FIG. 5 is a schematic view of a transmission provided with a power-transfer fluid coupling of the present design and a slightly modified fluid coupling for effecting synchronized shifting of variable-speed gearing.

Referring particularly to FIG. 1 of the drawing, the fluid coupling 10 forming the subject matter of the invention has been illustrated as applied to a gas turbine engine of the split-shaft type. This engine is schematically illustrated and includes a gas generator section 11 and power section 12. The gas generator section includes a compressor 13 which, in the present instance, has two centrifugal impeller stages mounted on a shaft 14. Two-stage turbine wheels 15 are also mounted on this shaft to drive the compressors, and air from the compressors is supplied to combustor means 16 to be burned with fuel for the purpose of supplying gas to drive the turbines. Gas exhausted from the turbines is supplied to a single-stage rotor 17 of the power turbine section of the engine. In a split-shaft turbine, the power section ordinarily rotates independently of the gas generator section. When a split-shaft gas turbine is employed to drive a vehicle, for example, power is directly transferred from the power turbine to driving mechanism of the vehicle. It is obvious that this power may be imparted through one or more transmission mechanisms to the driving wheels of the vehicle.

Output shaft 18 of the coupling 10 shown in FIG. 1 may be connected with a suitable change-speed transmission (not shown). In the system shown in FIG. 1, the fluid coupling 10 forms a direct connection between the power turbine and the shaft 18. Its operation will be set forth later.

The coupling 10 is shown in detail in FIG. 2. It includes an input shaft 20 which is directly connected to one end of the coupling housing 21. The output shaft 18 is directly connected with the housing 21 at the opposite end. It is obvious that although the housing is shown as one piece it may be fabricated from as many pieces as necessary. Housing 21 is provided at an intermediate point with an annular enlargement 23 extending completely around the housing and forming an annular groove 24 within the housing. This groove is traversed, as shown in FIG. 2A, by a plurality of spaced webs or vanes 25. The housing is also provided with an internal tubular portion 26 extending axially into the housing from one end, this portion providing an annular, outwardly facing groove section 27 which registers with and is spaced from the groove section 24. Housing 21 further provides a cylindrical sections 28 and 30 at each end, section 28 receiving a second housing portion 31 which is rotatable relative to the portion 21. Portion 31 is rigidly secured to a shaft 32 which is an extension of shaft 14 and arranged in telescoping relationship with the input shaft 20.

One end of the shaft 32 extends beyond the housing section 31 and is supported for rotation in a bearing 33 carried by the inwardly projecting portion 26 of housing 21. The housing section 31 also has a tubular, inwardly projecting portion 34, this portion and portion 26 of housing 21 each being provided with a disc-like piston structure 35 and 35A, respectively. These piston structures are disposed within piston chambers 36 formed in cylinder elements 37 which are received for axial movement in the housing portions. They are guided for axial movement and restrained against rotation relative to their respective housing portions by rollers 38 mounted on the elements 37. The rollers are engaged with guide ribs 40 formed in the respective housing portions. Suitable seal rings are provided in the elements 37 and pistons 35 and 35A to prevent the escape of fluid under pressure supplied to the cylinders 37 to impart movement thereto. Shaft 18 and projection 26, as well as shaft 32 and projection 34, are provided with passages through which fluid under pressure may be supplied to the chamber 36 on opposite sides of the pistons 35 and 35A to effect movement of elements 37 in the operation of the fluid coupling. It will be obvious that when the space on one side of either piston is connected with a source of fluid pressure, the space on the other side of such piston must be connected with exhaust, or other suitable reservoir, to permit motion to be imparted to the movable cylinder element containing the same. In this instance, the cylinder elements in which the piston chambers are formed constitute the movable elements.

Each of the cylinder elements 37 is provided with a circular row of vanes, the vanes on the element 37 disposed in housing 21 being designated by the numeral 41, the other vanes being designated by the numeral 42. It will be apparent from FIGS. 2, 3 and 4 that vanes 41 and 42 may be moved from the inactive positions shown in FIG. 2 to active positions shown in FIGS. 3 and 4. In the latter positions the vanes 41 and 42 are disposed in the space between the groove sections 24 and 27. In the inactive positions shown in FIG. 2, the vanes are withdrawn from the space between the groove sections 24 and 27, and the side walls 43 and 44 at the outer ends of vanes 41 and 42 substantially complete an annular chamber 45.

In the operation of the fluid coupling, the housing is kept completely filled with hydraulic fluid. This fluid may be supplied through the hollow interior of the shaft 18. Some of this fluid may escape through one or more outlets 46 to a reservoir (not shown). Such fluid may also be passed through suitable cooling means (not shown) during transfer to or from the reservoir. As previously pointed out, housing 21 forms a direct connection between the power turbine 17 and the output shaft 18. When the power turbine rotates, housing 21 will likewise rotate. Movement of the power turbine will thus be transmitted to the point of use.

One of the features of the fluid coupling is the ability to flexibly connect or transmit power from the gas generator section of the engine to the power turbine and consequently the driven device. To effect this operation, element 37 in the housing section 31 will be moved to extend vanes 42 into the space 45 between the groove sections 24 and 27. This function is performed by directing fluid under pressure through passage 32A to the portion of piston chamber 36 at the right-hand side of piston 35. Such fluid pressure will react against the adjacent end wall of cylinder element 37, causing it to move toward the right. As it moves, fluid in piston chamber 36 at the left-hand side of piston 35 will flow out through passage 32B which will then be connected with a suitable reservoir. When disposed in the space between groove sections 24 and 27, vanes 42 will impart motion to the fluid in the groove or annnular chamber 45, causing it to move outwardly to groove section 24, inwardly at the right-hand side of the groove to the groove section 27, and back to the vanes 42. This movement of the fluid will transmit motion through vanes 25 to the housing 21. The gas generator will thus transmit power through shaft 32, element 37, vanes 42 and 25, to housing 21, and from this housing to shaft 18 and the vehicle wheels. The efficiency of the engine during part-load operation will be increased in this manner. It will be obvious that the amount of power transmitted by vanes 42 to vanes 25 can be varied by regulating the extent of projection of the vanes 42 into the space 45.

In the operation of a vehicle driven by a gas turbine engine, it is necessary at times to apply a braking force to the vehicle. As is well known, the most efficient braking force to utilize is that provided by the vehicle engine. To secure this object with the present fluid coupling, vanes 41 and 42 are projected into the chamber 45, as shown in FIG. 4. Vanes 42 will be moved as above described. Vanes 41 will be moved into chamber 45 by directing fluid under pressure through passage 22A to the portion of piston chamber 36 at the left side of piston 35A. At this time, passage 22B will be connected with the appropriate reservoir and fluid pressure will react on the chamber end wall adjacent piston 35, causing the vanes 41 to move into space 45. When the vanes 41 and 42 are positioned in chamber 45, shaft 18 imparts rotary motion to the vanes 41 as well as the housing containing vanes 25. This motion will cause fluid in the chamber 45 to move outwardly on the right-hand side of chamber 45, as viewed in FIG. 2, and inwardly along the left-hand side of the chamber. A torque of liquid moving in a counterclockwise direction will be generated. This liquid will react against vanes 42, causing rotary motion of element 37 with which vanes 42 are formed; the motion will be transmitted through shaft 32 to the gas generator section of the engine. Since the compressor rotors are mounted on shaft 14, which will be coupled to shaft 32, the rotors will load the shaft by resisting rotary movement thereof. This loading will be transmitted through element 37, vanes 42, 25 and 41, and housing 21, to shaft 18. Since the vehicle is tending to drive the shaft 18, movement of the vehicle will be opposed.

The fluid coupling 10 thus serves a plurality of purposes. First, in the transmission of power from an engine to a vehicle, the housing of the coupling constitutes a direct connection. Second, in part-load operation the coupling transmits motion from the gas generator section of the engine to the output shaft which, in turn, drives the vehicle. Third, when the vehicle tends to roll due to momentum or downgrade operation, the coupling will transmit force from the output shaft 18 (which now becomes an input shaft) to the compressor section of the engine to provide resistance and a braking force of comprehensive proportion. By securing this braking force, a retarder (now in conventional use) with its attendant fan and oil cooler can be eliminated. As a fourth purpose, the transmission prevents the power turbine from overspeeding, by connecting it to the gas generator. In a case where the transmission is disengaged, and the engine is not connected to the driving wheels, upon reaching its speed limit the usual governor (not shown) of the power turbine will cause the fluid coupling to engage, similar to the braking mode, and connect the power turbine to the gas generator. The power turbine cannot then exceed the speed of the gas generator, except by the small amount due to slippage of the coupling. In another case, should the driver of a vehicle exceed the speed limit of the power turbine on a fast downhill run, the governor will again cause the engagement of the fluid coupling, thereby connecting the power turbine to the gas generator, which in this case will be equivalent to the braking mode. This is a distinct safety feature, since it will occur automatically without the attention of the driver.

In FIG. 5, the power transfer fluid coupling of the present invention is combined with a modified fluid coupling and variable-speed transmission to secure synchromesh shifting and connection of the gas generator section of the engine with the power turbine section during part-load operation. In FIG. 5, only the front ends of the gas generator and power turbine shafts 50 and 51, respectively, are shown. These shafts are coaxial and an intermediate shaft 52 is suitably supported for rotation in parallel relation to the common axis of the shafts 50 and 51. Power-transfer fluid coupling 53, which corresponds to the fluid coupling described above, and a modified version 54 thereof are arranged on the axis of intermediate shaft 52. Suitable gears 55, 56, 57, and 58 transfer rotary motion from the shaft 52 to a shaft 60 for transmission to the point of use. The gas generator and power turbine shafts are provided with pinions 61 and 62, respectively, which mesh with gears 63 and 64. Gear 63 is secured to a shaft 65 which extends into the power-transfer fluid coupling 53 and corresponds to shaft 32 in the first form of the invention. Gear 64 is provided on the housing 21A of the power transfer fluid coupling 53 to drive, or be driven thereby, in the same manner as shaft sections 20 or 18 of the first form of the invention. Housing 21A is equipped with a shaft 66 which extends into the modified synchronizing fluid coupling 54. A second shaft 67 surrounds shaft 66 and also extends into coupling 54. Shaft 67 is equipped with a gear 68 disposed in meshing relation with a gear 70 also secured for rotation with the power turbine shaft 51. Due to the size differential, gear sets 62, 64 and 68, 70 serve as down-shift and up-shift pairs, respectively. The power turbine and secondary shafts are provided with sets of speed-change gears in constant meshing relationship to provide desired torque and speed requirements. As many sets of such gears as desired may be provided, five sets 71 to 75, inclusive, being shown. Suitable clutch mechanisms 76 are provided between the gear sets and the secondary shaft to establish the desired drive connection at the requisite time. The clutch mechanisms 76 are operated automatically at such time by control mechanisms (not shown).

Power-transfer fluid coupling 53 functions in the same manner as coupling 10 previously described. In the normal operation, power is transmitted from the engine through the power turbine shaft 51, through the respective gears of sets 71 to 75 which are operatively connected at the time to secondary shaft 52, through gears 55, 56, 57, and 58, to the drive shaft 60. When part-load operation takes place and the gas generating section of the engine tends to run faster than the power turbine section, the coupling 53 establishes a connection between the gas generator and power turbine sections and transmits supplementary power to the drive shaft. When the load tends to drive the engine, the power-transfer fluid coupling 53 establishes a connection between the power turbine shaft and the gas generator shaft to transmit the power developed by the load due to momentum or downgrade operation to the compressor of the gas generator section in the same manner as previously described. This operation is effected by shifting the vanes in the power-transfer fluid coupling to operative positions. Suitable control mechanisms (not shown) will be employed to cause the shifting of the rows of vanes prior to the application of the vehicle wheel brakes so that the engine load will be used to initially reduce vehicle speed. The synchronizing fluid coupling 54 is similar to coupling 53, but neither set of adjustable vanes is coupled to the housing. It provides a truly flexible fluid connection between either shaft 50 or 51 and the intermediate shaft 52. The primary purpose of coupling 54 is to drive shaft 52 in the operation of accelerating or decelerating the same to synchronize the speeds between gear changes.

It will be noted that the selected ratios of up-shift and down-shift gear pairs fall beyond the respective ratios of the sets of gears in the transmission; i.e., gear pair 62, 64 has a lower ratio than set 71, and gear pair 70, 68 has a higher ratio than set 75. This selection is necessary to secure proper synchronizing speeds.

I claim:
1. A fluid coupling, comprising:
 (a) housing means forming spaced opposed inner and outer annular groove sections, the latter being provided with circumferentially spaced transversely extending vanes;
 (b) a first means in said housing providing a series of vanes supported for movement between an extended position within the space between said groove sections and a retracted position withdrawn from said space, said series of vanes being rotatable with said housing means;
 (c) a second means in said housing providing a second series of vanes supported for movement between an extended position within the space between said groove sections and a retracted position withdrawn from said space, said second series of vanes being rotatable relative to said housing means; and
 (d) fluid pressure responsive means for moving said first and second means to dispose said series of vanes in extended and retracted positions.

2. A fluid coupling according to claim 1 in which the height of the vanes in the first series differs from that of the vanes in the second series.

3. A fluid coupling according to claim 1 in which said first and second means have wall means at the inner ends of said vanes to substantially connect the sides of the inner and outer groove sections when the vanes are retracted.

4. A fluid coupling according to claim 1 in which said first and second means have wall means at each end of said vanes to substantially connect the sides of the inner and outer groove sections when the vanes are in extended and retracted positions.

5. A fluid coupling according to claim 1 in which the vanes of the first series radially register with the vanes in the outer groove section when in an extended position.

6. A fluid coupling according to claim 1 in which said housing and first and second means have cooperating cylinder and piston means responsive to fluid pressure to move the series of vanes between extended and retracted positions.

7. A fluid coupling according to claim 1 in which said housing and first and second means have cooperating guides and followers to make said first and second means rotate with the respective housing portion and move axially relative thereto.

8. A fluid coupling according to claim 1 in which said housing means has outer and inner relatively rotatable portions, the groove section being formed by the outer housing portion, the first means being received in the outer housing portion and the second means being received by the inner housing portion.

9. A fluid coupling according to claim 8 in which said outer housing portion and said first means and said inner housing portion and said second means, respectively, have cooperating guides and followers to make said first and second means rotate with the respective housing portion and move axially relative thereto, said first and second series of vanes being relatively rotatable with the respective housing portion.

10. A fluid coupling according to claim 8 in which shaft means are provided on said relatively rotatable housing portions to transmit rotary motion to and from said coupling.

11. A fluid coupling, comprising:
   (a) a first housing means forming a substantially cylindrical chamber with spaced opposed inner and outer annular groove sections intermednate the ends of the housing, a series of circumferentially spaced vanes extending transversely of the outer groove section;
   (b) a second housing means disposed in one end of said first housing means for rotation relative thereto, said first and second housing means forming piston structures;
   (c) cylinder means disposed in said housing means for cooperation with said piston structures to effect movement of said cylinder means axially of said housing means in response to fluid pressure; and
   (d) vane means on said cylinder means for movement therewith between extended positions within the space between said groove sections and retracted positions withdrawn from said space, the vane means on one cylinder means substantially registering with the vanes in the outer groove when in an extended position.

12. A fluid coupling according to claim 11 in which said housing means and said cylinder means are provided with guides and followers cooperatively arranged to provide for relative axial movement between the housing means and the respective cylinder means and prevent relative rotary movement therebetween.

13. A fluid coupling according to claim 11 in which means are provided to admit fluid pressure to said cylinder means to effect movement of said vane means between extended and retracted positions.

14. A fluid coupling according to claim 11 in which said housing means are provided with guides and said cylinder means have rollers for engagement with said guides to preclude relative rotary movement between the respective housing and cylinder means and provide for axial movement of said cylinder means in said housing means to extend and retract said vane means.

No references cited.

EDGAR W. GEOGHEGAN, *Primary Examiner.*